(12) United States Patent
Zanarini et al.

(10) Patent No.: US 11,087,422 B2
(45) Date of Patent: Aug. 10, 2021

(54) METHOD AND DEVICE FOR DETERMINING A CONFIGURATION FOR DEPLOYMENT OF A PUBLIC TRANSPORTATION SYSTEM

(71) Applicant: ABB Schweiz AG, Baden (CH)

(72) Inventors: Alessandro Zanarini, Baden (CH); Jan Poland, Nussbaumen (CH); Hans Joachim Ferreau, Würenlos (CH); Mehmet Mercangoez, Stein (CH); Michel Bierlaire, Orbe (CH); Riccardo Scarinci, Lausanne (CH); Virginie Lurkin, Waremme (BE); Mathieu Horsky, Carouge (CH); S. Sharif Azadeh, Rotterdam (NL); Yousef Maknoon, Rotterdam (NL)

(73) Assignee: ABB Schweiz AG, Baden (CH)

( * ) Notice: Subject to any disclaimer, the term of this patent is extended or adjusted under 35 U.S.C. 154(b) by 109 days.

(21) Appl. No.: 16/542,836

(22) Filed: Aug. 16, 2019

(65) Prior Publication Data
US 2020/0058090 A1 Feb. 20, 2020

(30) Foreign Application Priority Data
Aug. 16, 2018 (EP) .................................. 18189265

(51) Int. Cl.
*G06Q 50/26* (2012.01)
*G06F 16/29* (2019.01)
(Continued)

(52) U.S. Cl.
CPC ............ *G06Q 50/26* (2013.01); *G06F 16/29* (2019.01); *G06Q 10/047* (2013.01); *G06Q 10/06315* (2013.01)

(58) Field of Classification Search
CPC ............ G06Q 10/00–50/00; G06F 1/00–40/00
(Continued)

(56) References Cited

U.S. PATENT DOCUMENTS 8,706,409 B2 * 4/2014 Mason ............... G01C 21/3484
701/424
8,975,866 B2 3/2015 McGrath et al.
(Continued)

FOREIGN PATENT DOCUMENTS

CN 105760949 A 7/2016
WO 2011035427 A1 3/2011
(Continued)

OTHER PUBLICATIONS

Rogge, Matthias, et al. "Electric bus fleet size and mix problem with optimization of charging infrastructure." Applied Energy 211 (2018): 282-295 . . . (Year: 2018).*
(Continued)

*Primary Examiner* — Alan S Miller
(74) *Attorney, Agent, or Firm* — Taft Stettinius & Hollister LLP

(57) ABSTRACT

Techniques for determining a configuration for deployment of a public transportation system including a plurality of electric public transportation vehicles, in particular electric buses, are disclosed. At least one processor may determine, prior to deployment of the public transportation system and based on received information on timetables and geographical route profiles, a fleet size of a fleet of electric public transportation vehicles, on-board battery parameters of on-board batteries to be installed in electric public transportation vehicles, and charging infrastructure parameters associated with a charging infrastructure to be installed for charging the on-board batteries of the electric public transportation vehicles.

17 Claims, 12 Drawing Sheets

(51) Int. Cl.
*G06Q 10/04* (2012.01)
*G06Q 10/06* (2012.01)
(58) Field of Classification Search
USPC .............................................. 705/7.11–7.42
See application file for complete search history.

(56) References Cited

U.S. PATENT DOCUMENTS

| | | | | |
|---|---|---|---|---|
| 9,132,742 | B2* | 9/2015 | Dai | B60L 53/63 |
| 9,132,842 | B2 | 9/2015 | Brown | |
| 9,505,318 | B2* | 11/2016 | Hendrix | B60L 53/66 |
| 2004/0130292 | A1* | 7/2004 | Buchanan | B60L 53/53 320/116 |
| 2004/0230680 | A1* | 11/2004 | Jain | G06F 9/5061 709/226 |
| 2009/0234521 | A1* | 9/2009 | Kumar | B60L 15/2045 701/19 |
| 2010/0145609 | A1* | 6/2010 | Boss | G06Q 30/018 701/22 |
| 2010/0228405 | A1* | 9/2010 | Morgal | B60L 53/68 701/2 |
| 2010/0274656 | A1* | 10/2010 | Genschel | G06Q 30/0284 705/14.27 |
| 2011/0238457 | A1* | 9/2011 | Mason | G06Q 10/063112 705/7.14 |
| 2012/0203726 | A1* | 8/2012 | Klabjan | B60L 53/65 706/46 |
| 2012/0280653 | A1* | 11/2012 | Prosser | B60L 53/68 320/109 |
| 2012/0330494 | A1* | 12/2012 | Hendrix | B60L 53/66 701/29.3 |
| 2013/0222158 | A1* | 8/2013 | Dai | B60L 53/14 340/995.13 |
| 2013/0342165 | A1* | 12/2013 | Brimacombe | B60L 53/31 320/109 |
| 2014/0304025 | A1* | 10/2014 | Steven | H02J 3/008 705/7.24 |
| 2015/0032516 | A1* | 1/2015 | Deshpande | G06Q 50/06 705/13 |
| 2015/0298555 | A1* | 10/2015 | Bennett | B60L 1/14 701/22 |
| 2017/0083989 | A1* | 3/2017 | Brockman | G06Q 50/06 |
| 2019/0265703 | A1* | 8/2019 | Hicok | G06Q 50/30 |

FOREIGN PATENT DOCUMENTS

| | | |
|---|---|---|
| WO | 2013055830 A1 | 4/2013 |
| WO | 2014091238 A2 | 6/2014 |

OTHER PUBLICATIONS

Chao et al., (Optimizing Battery Electric Bus Transit Vehicle Scheduling with Battery Exchanging: Model and Case Study, 13th COTA International Conference of Transportation Professionals, Procedia—Social and Behavioral Sciences, 2013, vol. 96, pp. 2725-2736) (Year: 2013).*

Babin et al., "TCO Improvement of Commercial Electric Vehicles using Battery Sizing and Intelligent Charge Method," IEEE 2016 International Conference on Electrical Systems for Aircraft, Railway, Ship Propulsion and Road Vehicles & International Transportation Electrification Conference (ESARS-ITEC), 6 pp.

Chakroborty et al., "Optimal Route Network Design for Transit Systems Using Genetic Algorithms," Engineering Optimization, 2002, vol. 34, No. 1, pp. 83-100.

Fan et al., "Some Computational Insights on the Optimal Bus Transit Route Network Design Problem," Journal of the Transportation Research Forum, vol. 47, No. 3, 2012, pp. 61-75.

Tirachini et al., "Multimodal pricing and optimal design of urban public transport: The interplay between traffic congestion and bus crowding," Transportation Research Part B, vol. 61, 2014, pp. 33-54.

Wang et al., "Traffic-Constrained Multiobjective Planning of Electric-Vehicle Charging Stations," IEEE Transactions on Power Delivery, vol. 28, No. 4, Oct. 2013, pp. 2363-2372.

European Patent Office, Extended Search Report issued in corresponding Application No. 18189265.4, dated Nov. 28, 2018, 12 pp.

Chao et al., Optimizing Battery Electric Bus Transit Vehicle Scheduling with Battery Exchanging: Model and Case Study, 13th COTA International Conference of Transportation Professionals, Procedia—Social and Behavioral Sciences, 2013, vol. 96, pp. 2725-2736.

Hermes, J., How Traffic Jams Affect Air Quality, Jan. 5, 2012, Retrieved from the Internet: https://www.environmentalleader.com/2012/01/how-traffic-jams-affect-air-quality/.

Lampe, B., Does Engine Performance Depend on Climate and Altitude?, Apr. 27, 2017, Retrieved from the Internet: http://knowhow.napaonline.com/engine-performance-depend-climate-altitude/.

Opsgenie, A., Does the number of passengers in a car have an impact on fuel mileage/consumption?, Mar. 15, 2017, Retrieved from the Internet: https://www.quora.com/Does-the-number-of-passengers-in-a-car-have-an-impact-on-fuel-mileage-consumption.

Chakroborty et al., Optimal route network design for transit systems using genetic algorithms, Engineering optimization 34.1 (2002): 83-100.

Fan et al., Some Computational Insights on the Optimal Bus Transit Route Network Design Problem, Journal of the Transportation Research Forum. vol. 47. No. 3. 2012.

Tirachini et al., Multimodal pricing and optimal design of urban public transport: The interplay between traffic congestion and bus crowding, Transportation Research Part B: Methodological 61 (2014): 33-54.

Wang et al., Traffic-Constrained Multiobjective Planning of Electric-Vehicle Charging Stations, IEEE Transactions on Power Delivery 28.4 (2013): 2363-2372.

* cited by examiner

METHOD AND DEVICE FOR DETERMINING A CONFIGURATION FOR DEPLOYMENT OF A PUBLIC TRANSPORTATION SYSTEM

FIELD OF THE INVENTION

Embodiments of the invention relate to methods, computer executable instruction code, devices and systems for determining a configuration for deployment of a public transportation system. Embodiments of the invention relate in particular to techniques that assist a user in determining a configuration of both a fleet of electric public transportation vehicles and of an associated charging infrastructure so as to meet a desired timetable along plural geographical routes, during a planning phase prior to the respective public transportation system start of operations.

BACKGROUND OF THE INVENTION

Public transportation systems using electric vehicles such as electric buses are of increasing importance. Determining a suitable configuration for deployment of such a public transportation system is a considerable challenge. Electric buses are equipped with costly on-board batteries. Charging infrastructure is a limited resource that may need to be shared among the electric public transportation vehicles. The charging infrastructure may also include additional batteries to buffer energy and avoid unwanted high peak load on the distribution grid. It is therefore adamant to find a good trade-off between all the degrees of freedom in order to achieve a good or preferably even optimum solution for deployment of a public transportation system that uses electric buses or other electric public transportation vehicles having on-board batteries.

A. Tirachini et al., "Multimodal pricing and optimal design of urban public transport: The interplay between traffic congestion and bus crowding." Transportation Research Part B: Methodological 61 (2014): 33-54 discusses the interplay between traffic congestion and bus crowding, but does not address the problems associated with charging infrastructure.

P. Chakroborty et al., "Optimal route network design for transit systems using genetic algorithms." Engineering optimization 34.1 (2002): 83-100 discusses route set and schedule design, but does not address problems associated with the layout of charging infrastructure or on-board batteries.

W. D. Fan et al., "Some computational insights on the optimal bus transit route network design problem." Journal of the Transportation Research Forum. Vol. 47. No. 3. 2012 discusses the optimal bus transit route network design problem, but does not address problems associated with the layout of charging infrastructure or on-board batteries.

G. Wang et al., "Traffic-constrained multiobjective planning of electric-vehicle charging stations." IEEE Transactions on Power Delivery 28.4 (2013): 2363-2372 relates to the planning of electric-vehicle charging stations. The approach does not take into account the specific requirements and needs that arise in a public transportation network where a fleet of electric transportation vehicles with on-board batteries needs to meet a desired timetable and needs to operate along certain fixed geographic route profiles.

U.S. Pat. No. 9,132,842 B2 discloses techniques for locating charging stations. The techniques are not tailored for the specific requirements and needs that arise in a public transportation network where a fleet of electric transportation vehicles with on-board batteries needs to meet a desired timetable and needs to operate along certain fixed geographic route profiles.

U.S. Pat. No. 8,975,866 B2 discloses a technique of determining charge set points for energy storage systems based on target end points and an estimated energy consumption. The techniques are not tailored for the specific requirements and needs that arise in a public transportation network where a fleet of electric transportation vehicles with on-board batteries needs to meet a desired timetable and needs to operate along certain fixed geographic route profiles. Furthermore, it does not address the system perspective that includes essential aspects such as, without limitation, fleet sizing, timetable, dimensioning of the optional buffer energy storage and its ageing present inside the charging stations.

CN 105760949 A discloses a technique for determining a number of chargers of a charging station. The techniques do not provide assistance with regard to determining a suitable configuration of on-board batteries nor their respective ageing.

WO 2011/035427 A1 discloses techniques for simulating vehicle energy use in fleet management. The techniques do not provide assistance with regard to determining a suitable configuration of charging stations.

WO 2013/055830 A1 discloses techniques for maximization of on-board battery life under fixed-route applications. The techniques do not provide assistance with regard to determining a suitable configuration of charging infrastructure.

A. Babin et al., "TCO Improvement of commercial electric vehicles using traction battery sizing and intelligent charge method." IEEE. 2016 International Conference on Electrical Systems for Aircraft, Railway, Ship Propulsion and Road Vehicles & International Transportation Electrification Conference (ESARS-ITEC). 2016 discloses techniques for determining suitable charging strategies. The techniques do not provide assistance with regard to determining a suitable configuration of charging infrastructure.

SUMMARY

In view of the above, there is a continued need for methods, devices, systems and computer programs that assist a user, e.g. an operator of a public transportation network, in the complex task of determining a suitable configuration for deployment of a public transportation system. There is in particular a need for such techniques that allow good deployment configurations to be determined both with regard to on-board batteries and with regard to charging infrastructure (as they are crucially linked to each other), while taking into account the specific constraints that exist in a public transportation system where timetables and geographic route profiles are generally predefined or can otherwise not be altered arbitrarily. There is in particular a need for such techniques that allow good deployment configurations to be determined in accordance with quantitative criteria, so as to find optimum solutions for the deployment configuration.

According to the invention, a method, computer-executable instruction code, and a computing device or computing system as recited in the independent claims are provided. The dependent claims define embodiments.

According to an embodiment, a method of determining a configuration for deployment of a public transportation system is provided. The public transportation system comprises comprising a plurality of electric public transportation vehicles, in particular electric buses.

The method may comprise receiving, at an interface, information on timetables and geographical route profiles of public transportation lines to be served by the plurality of electric public transportation vehicles. The method may further comprise automatically determining by at least one processor, prior to deployment of the public transportation system and based on the received information on timetables and geographical route profiles, at least the following:
- a fleet size indicating a count of the plurality of electric public transportation vehicles that is to service the public transportation lines and
- on-board battery parameters of on-board batteries to be installed in the plurality of electric public transportation vehicles and
- charging infrastructure parameters associated with a charging infrastructure to be installed for charging the plurality of electric public transportation vehicles for which an objective function that is dependent on the fleet size, the on-board battery parameters, and the charging infrastructure parameters has an optimal value under constraints, the constraints being dependent on the received information on timetables and geographical route profiles.

The timetables may be enforced as hard constraints. Alternatively, flexibility may be provided with regard to the timetables. For illustrations, the method may comprise receiving, via a user interface, information indicative of possible deviations from the timetables. The information indicative of possible deviations from the timetables may allow a user to specify a minimum and/or maximum time at a terminal. In case such flexibility is provided, the method may further comprise outputting an optimum time within the range specified by the user, thereby performing optimization also with regard to waiting times at a terminal or at plural terminals. The optimum time may be optimum with respect to all constraints that are to be observed. When a user is allowed to specify a minimum and/or maximum time at a terminal, the user may also be allowed to enter a maximum time equal to the minimum time, thereby indicating that the time is a hard constraint for the respective terminal.

The method may further comprise retrieving, by the at least one processor, over a data network supplemental information comprising at least one of the following: historical weather conditions in an area in which the public transportation system is to be deployed; an elevation profile along the geographical route profiles; historical traffic data in the area; expected passenger counts along the geographical route profiles.

Automatically determining the fleet size, the on-board battery parameters, and the charging infrastructure parameters may comprise the following steps performed prior to deployment of the public transportation system: simulating an electric power consumption along the geographical route profiles using the supplemental information; and computing on-board battery lifetimes of the on-board batteries to be installed in the plurality of electric public transportation vehicles based on the simulated electric power consumption and optionally battery lifetimes of buffer batteries placed inside the charging stations.

The objective function may be dependent on both the simulated electric power consumption and the computed on-board battery lifetimes.

The objective function may be dependent on an electric grid to which the charging infrastructure is to be connected.

The objective function or constraints may be dependent on a distance between a candidate location of a charging station from the electric grid.

The objective function may be dependent on the availability of local energy production, such as the availability of solar energy that may be used for local energy production at a charging station using photoelectric cells or the availability of wind energy.

The simulated electric power consumption may be determined in dependence on the historical weather conditions and the predicted passenger counts along the geographical route profiles.

The at least one processor may determine the fleet size, the on-board battery parameters and the charging infrastructure parameters concurrently.

The constraints may enforce that public transportation service is provided in accordance with the timetables and geographical route profiles once the public transportation system has been deployed.

Determining the charging infrastructure parameters may comprise determining locations at which charging stations are to be installed relative to the geographical route profiles.

The locations at which charging stations are to be installed relative to the geographical route profiles may be determined in dependence on a distance of the respective locations from an electric grid to which the charging stations are to be connected.

The locations at which charging stations are to be installed relative to the geographical route profiles may be determined in dependence on the availability of local energy production, such as the availability of solar energy that may be used for local energy production at a charging station using photoelectric cells.

Determining the charging infrastructure parameters may comprise determining which types of charging stations are to be installed relative to the geographical route profiles.

The types of charging stations may be selected from a group consisting of charging stations having an energy storage system and charging stations having no energy storage system.

The types of charging stations may be selected from a group consisting of a flash feeding station without energy storage system, a flash feeding station with energy storage system, a terminal feeding station, and a depot feeding station. Flash feeding stations may be configured for rapid wireless energy transfer.

Determining which types of charging stations are to be installed may comprise at least one of: determining an input power of respectively each one of the charging stations; determining an output power respectively each one of the charging stations; determining a capacity of an energy storage system of each charging station having an energy storage system; determining which ones of the charging stations are to be shared by at least two different public transportation lines having different geographical route profiles.

Determining the on-board battery parameters may comprise determining a chemistry type and/or capacity of the on-board batteries to be installed in the electric public transportation vehicles.

The chemistry type may be determined from a group consisting of lithium iron phosphate (LFP), hard carbon/nickel cobalt manganese oxide (NCM), lithium manganese phosphate, lithium-ion chemistries.

The method may further comprise determining, by the at least one processor, a robustness of the determined fleet size, on-board battery parameters and charging infrastructure parameters towards system disruptions.

The objective function may represent a total power consumption required for deployment and operation of the public transportation system.

The objective function may represent ecological costs, such as an ecological footprint, required for deployment and operation of the public transportation system.

The objective function may represent a total cost of ownership for the public transportation system.

The objective function may represent working time for installation and operation of the public transportation system.

The objective function may include costs associated with purchase, maintenance and operation of the plurality of electric vehicles comprising on-board batteries and costs associated with the installation maintenance and operation of the charging infrastructure.

The objective function may include at least a term associated with secondary services provided by the electric vehicles and/or the charging infrastructure.

The secondary services may include grid services.

The secondary services may be selected from a group consisting of temporary energy storage, frequency regulation and distribution grid support.

The constraints may be hard constraints or soft constraints.

The method may further comprise determining a robustness of the determined fleet size, on-board battery parameters and charging infrastructure parameters towards system disruptions. Determining the robustness may comprise performing traffic simulations for various traffic conditions.

The method may further comprise determining, by the at least one processor, multiple fleet sizes, on-board battery parameter sets and/or charging infrastructure parameter sets, together with their key performance indicators for outputting via a user interface. The multiple fleet sizes, on-board battery parameter sets and/or charging infrastructure parameter sets may correspond to different objectives or combinations of objectives in a multi-objective optimization. A human decision maker may take a decision on which one of the multiple fleet sizes, on-board battery parameter sets and/or charging infrastructure parameter sets is most appropriate for deployment of the public transportation system.

The key performance indicators may comprise costs under different lifetime assumptions, performance key performance indicators, and/or robustness towards system disruptions Computer-executable instruction code according to an embodiment comprises instructions which, when executed by at least one processor of a computing device or of a distributed computing system, cause the at least one processor to perform the method of any one of the embodiments disclosed herein.

A computing device or distributed computing system according to an embodiment may comprise an interface configured to receive information on timetables and geographical route profiles of public transportation lines to be served by a plurality of electric public transportation vehicles. The computing device or distributed computing system may comprise at least one processor configured to automatically determine, based on the received information on timetables and geographical route profiles and prior to deployment of the public transportation system, at least the following:

a fleet size indicating a count of the plurality of electric public transportation vehicles that is to service the public transportation lines and on-board battery parameters of on-board batteries to be installed in the plurality of electric public transportation vehicles and charging infrastructure parameters associated with a charging infrastructure to be installed for charging the plurality of electric public transportation vehicles for which an objective function that is dependent on the fleet size, the on-board battery parameters, and the charging infrastructure parameters has an optimal value under constraints, the constraints being dependent on the received information on timetables and geographical route profiles.

The at least one processor may be configured to retrieve over a data network supplemental information comprising at least one of the following historical weather conditions in an area in which the public transportation system is to be deployed; an elevation profile along the geographical route profiles; historical traffic data in the area; expected passenger counts along the geographical route profiles.

The at least one processor may further be configured to simulate an electric power consumption along the geographical route profiles using the supplemental information and compute on-board battery lifetimes of the on-board batteries to be installed in the plurality of electric public transportation vehicles based on the simulated electric power consumption, wherein the objective function may be dependent on both the simulated electric power consumption and the computed on-board battery lifetimes.

The at least one processor may be configured to perform the method of any embodiment disclosed herein.

The methods, devices, systems and computer programs according to the invention assist a human user in the complex task of determining a suitable configuration for deployment of a public transportation system, while taking into account the specific constraints that exist in a public transportation system where timetables and geographic route profiles are generally predefined or can otherwise not be altered easily.

The methods, devices, systems and computer programs according to the invention allow good deployment configurations to be determined in accordance with quantitative quality criteria, so as to find optimum solutions for the deployment configurations. The quantitative quality criteria may take into account the costs (e.g., economic, ecological, work-related or otherwise) associated with purchase, maintenance and operation of the plurality of electric vehicles comprising on-board batteries and with the installation maintenance and operation of the charging infrastructure.

External constraints, such as the configuration of the electric power grid to which the charging infrastructure is to be connected and/or the number of sunshine hours in a certain area that could be used for energy production at a charging station equipped with photoelectric cells, may be taken into account in a quantitative manner.

Interfaces to data network, in particular to a wide area network, may facilitate the automatic retrieval of information on weather conditions and height profiles for the area in which the public transportation system is to be deployed. Weather conditions and height profile may significantly affect the state of charge of the on-board batteries.

BRIEF DESCRIPTION OF THE DRAWINGS

The subject matter of the invention will be explained in more detail with reference to preferred exemplary embodiments which are illustrated in the attached drawings, in which.

DETAILED DESCRIPTION OF EMBODIMENTS

Figure 1:
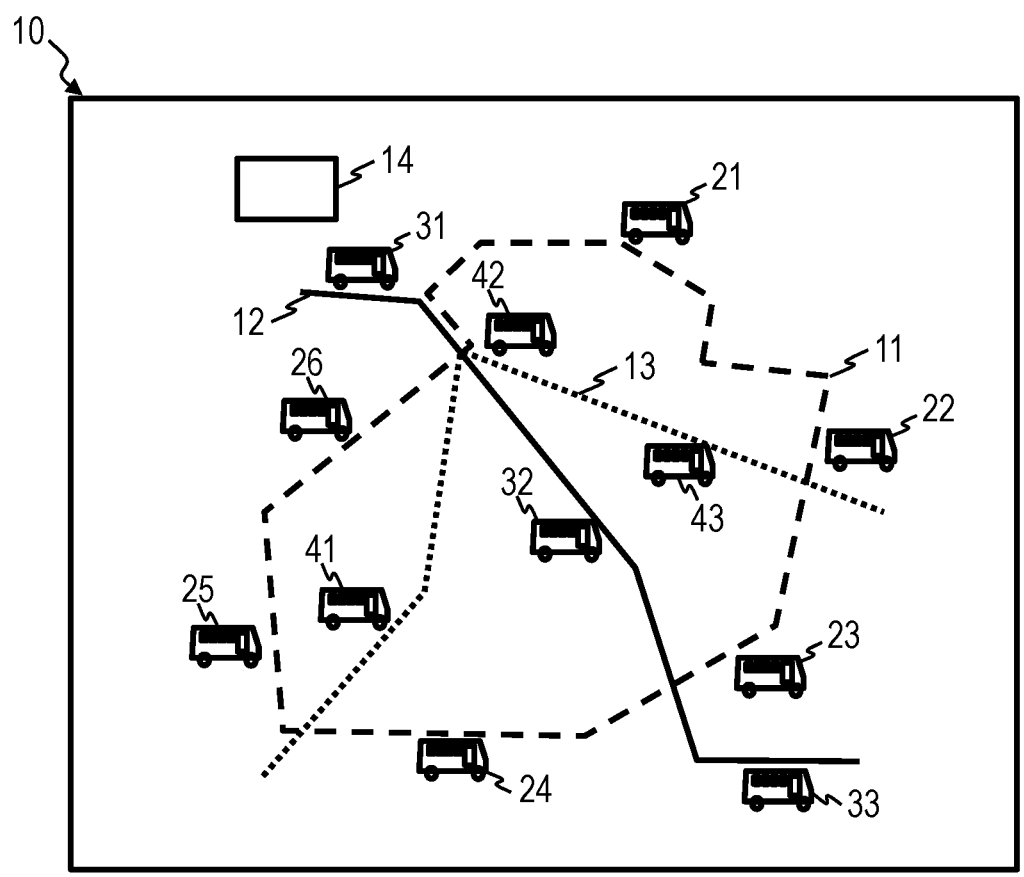
FIG. 1 is a schematic representation of a vehicle fleet of a public transportation system deployment configuration determined in accordance with embodiments of the invention.

Exemplary embodiments of the invention will be described with reference to the drawings in which identical or similar reference signs designate identical or similar elements. While some embodiments will be described in the context of exemplary charging infrastructure concepts and/or exemplary on-board battery concepts, the embodiments are not limited thereto. The features of embodiments may be combined with each other, unless specifically noted otherwise.

Embodiments of the invention may be used to optimize a configuration of both a fleet of electric buses having on-board batteries and of the associated charging infrastructure, without being limited thereto.

As used herein, the term "electric vehicle" encompasses both all-electric (or battery) vehicles and hybrid electric vehicles.

As used herein, the term "electric public transportation vehicle" encompasses all-electric buses and hybrid electric buses, without being limited thereto. The "electric public transportation vehicles" may be electric buses. The "electric public transportation vehicles" may be electric buses that operate without using overhead electric power lines. In some embodiments, the "electric public transportation vehicles" may be trams or other vehicles with overhead lines or bus rapid transport (BRT), where on-board batteries may be used as range extenders. Such batteries may allow, e.g., a tram to travel into areas where overhead lines are not present.

As used herein, the term "on-board battery" refers to a battery installed on-board an electric public transportation vehicle that is operative to power one or several electric motors for propelling the electric public transportation vehicle. The on-board battery may be a traction battery. The on-board battery may optionally power auxiliaries, such as an air conditioning system.

As used herein, the term "charging infrastructure" encompasses charging stations for charging on-board batteries of electric public transportation vehicles. At least some of the charging stations may comprise energy storage systems for temporary energy storage. For deployment of the public transportation system, the charging stations need to be installed. Some or all of the charging stations need to be connected to an electric grid. Alternatively or additionally, at least part of the charging stations can be equipped with a local power production device, such as photoelectric cells. As will be explained in more detail below, the layout of the electric grid, in particular its coverage, and/or the possibility of locally producing energy using renewable energy sources (such as solar energy) may be taken into account by a computing device or computing system that assists a user in determining which charging stations are to be installed and at which locations charging stations are to be installed.

The "charging infrastructure" may be a charging infrastructure that does not use overhead power lines for feeding energy to the electric public transportation vehicles. In some embodiments, overhead power lines may be used in addition to on-board batteries.

As used herein, the term "deployment of a public transportation system" may encompass the installation of charging infrastructure.

As used herein, the term "deployment configuration" may refer to a set of parameters of a public transportation system determined prior to installation of the charging infrastructure and prior to providing a fleet of electric public transportation vehicles having on-board batteries. The deployment configuration may comprise at least parameters associated with the electric public transportation vehicles and parameters associated with the charging infrastructure. The parameters associated with the electric public transportation vehicles may comprise a fleet size and battery parameters defining a capacity and/or chemistry type of on-board batteries. The parameters associated with the charging infrastructure may comprise one or more of charging infrastructure solution (such as over-night depot charging, terminal-only charging, also known as OppCharge, or en-route charging, such as TOSA (Trolleybus Optimisation Système Alimentation)-type charging), input and output power, presence and configuration of energy storage in the charging stations, locations of charging stations, combinations thereof, or further parameters.

Identifying a suitable configuration of the public transportation system is a formidable task, due to the technical constraints involved. Examples for such constraints are timetables and geographic route profiles that are to be met. Further examples for such constraints involve the layout of an electric grid to which the charging infrastructure of the public transportation system is to be connected; the availability of renewable energies for local energy production at charging stations; potential operation overhead, i.e., delay that certain charging infrastructure may incur prior to connecting to a bus; compatibility between certain charging infrastructure rated power and the on-board battery that depends on the size and chemistry of the on-board battery; ageing of the batteries (both on-board battery and charging station battery) that depends on the size, chemistry and operations (hence on the number of charging station installed for the on-board batteries, and on the fleet size for the charging station battery); fleet size that depends on the timetable and desired level of service (e.g., bus frequency); charging infrastructure that depends on the timetable (e.g., the longer the bus is allowed to stay at a terminal for recharging, the less en-route charging is required). The identification of a suitable deployment configuration may have considerable relevance on the feasibility, operation, reliance, and revenue of an electric public transportation system.

According to embodiments of the invention, a suitable deployment configuration of an electric public transportation system may be automatically determined, taking into account desired timetables, geographical route profiles, and other constraints such as the layout of the electric grid to which the charging infrastructure is to be connected and/or the availability of local energy production at the charging stations using renewable energies such as solar or wind power. The difficult task of identifying a suitable deployment configuration is thereby greatly facilitated.

FIG. 1 is a schematic view of a public transportation system that is to serve a plurality of bus lines extending along a plurality of geographical route profiles 11, 12, 13 in an area 10. A depot 14 is provided for over-night storage of electric public transportation vehicles. A user input may specify both the geographical route profiles 11, 12, 13, e.g. via a graphical user interface (GUI) or via a network interface. A user input may specify timetables along the plurality of geographical route profiles 11, 12, 13. The travel time and/or service frequency along the plurality of geographical route profiles 11, 12, 13 as defined in the timetables may vary as a function of time of day and as a function of day of week.

The methods and devices according to embodiments may automatically determine how many electric public transportation vehicles 21-26 are to operate along a first geographical route profile 11 of a first public transportation line. The methods and devices according to embodiments may automatically determine how many electric public transportation vehicles 31-33 are to operate along the second geographical route profile 12 of a second bus line, and/or how many electric public transportation vehicles 41-43 are to operate along the third geographical route profile 13 of a third public transportation line.

The methods and devices according to embodiments may automatically determine which on-board battery capacities and which chemistry types of on-board batteries are to be provided in the electric public transportation vehicles 21-26, 31-33, 41-43. The chemistry type may be selected from a group consisting of lithium iron phosphate (LFP), hard carbon/nickel cobalt manganese oxide (NCM), lithium manganese phosphate, lithium-ion chemistries, without being limited thereto.

Figure 2:
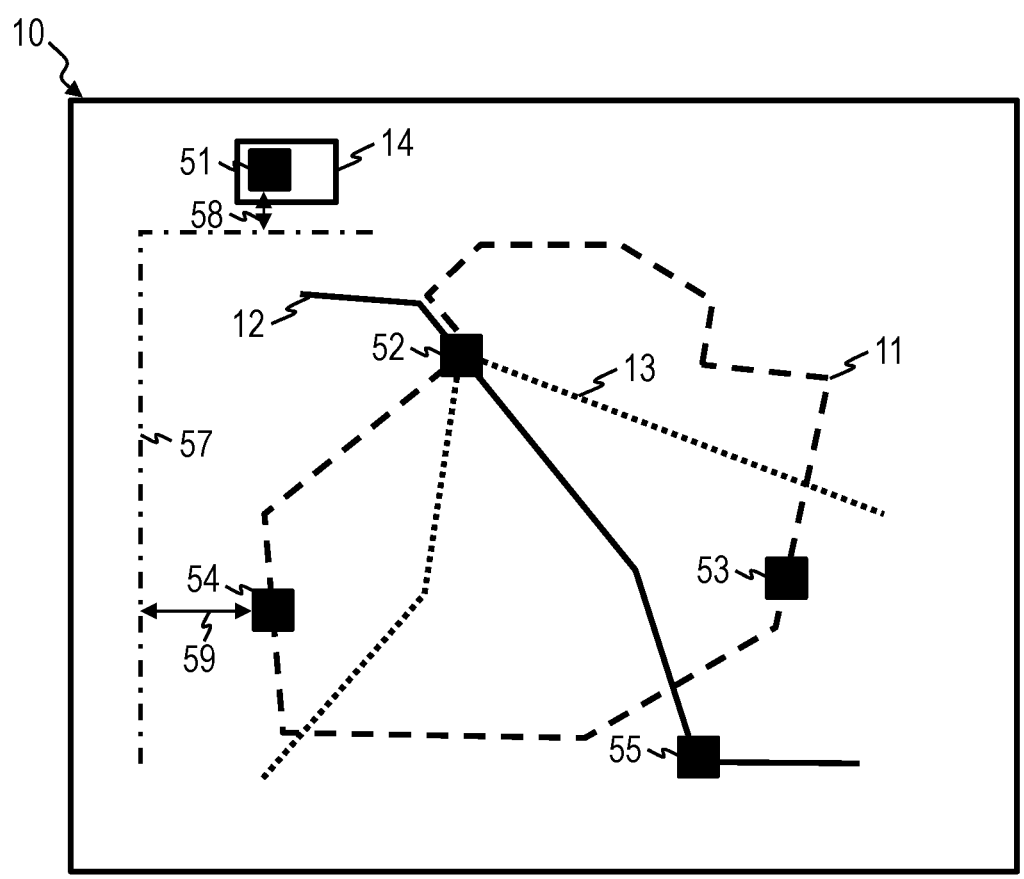
FIG. 2 is a schematic representation of a charging infrastructure of a public transportation system deployment configuration determined in accordance with embodiments of the invention.

FIG. 2 is a schematic view of the charging infrastructure in the area 10 that is to be provided for operation of the electric public transportation system. The charging infrastructure may comprise one (or more) charging station(s) 51 for depot charging. The charging infrastructure may comprise charging stations 52-55 for terminal charging and/or for flash charging at bus stops.

The charging infrastructure may also include additional batteries to buffer energy and avoid unwanted high peak load on the distribution grid. Charging infrastructures that can be used in electric bus deployment can be summarily categorized as:

over-night depot charging, where the on-board battery lasts for the whole day of operations and needs recharging only over-night at the depot 14;

terminal-only charging, also referred to as OppCharge, where the on-board battery gets partially replenished every time it reaches a terminal equipped with a charging station and also over-night;

en-route charging where the on-board battery gets additionally recharged also at some selected bus stops for a limited duration while passengers get off/on the bus, in addition to charging at the depot and at terminals.

The kind of charging infrastructure and on-board battery capacity as well as the specific bus route features impact the number of electric public transportation vehicles in the fleet and the respective driver costs, the running cost for the energy/power provided by the feeding stations, and the ageing of the battery (both on the bus and as part of the infrastructure).

The methods and devices according to embodiments may automatically determine the overall fleet size of electric public transportation vehicles that are to serve the various public transportation lines along the plurality of geographical route profiles 11, 12, 13 and the respective battery parameters of on-board batteries of the electric public transportation system. The methods and devices according to embodiments may automatically determine the locations and/or types of charging stations 51-55 that are to be installed for operation of the electric public transportation system. Additional parameters of the charging infrastructure, such as voltage and/or chemistry type of energy storage capacities provided in the charging infrastructure, may also be determined automatically.

According to embodiments, a holistic optimization approach may be used that integrates battery ageing, fleet size optimization, energy/power costs, and timetable optimization while exploring possibly varying conditions. The techniques may perform constrained optimization over an objective function (which may also be referred to as cost function).

The constrained optimization may take into consideration secondary purposes of the public transportation system, for instance electric grid services, which can be provided by the public transportation system to buffer energy and/or provide voltage or frequency stabilization for an electric grid to which the charging infrastructure is connected. Secondary grid services may be offered by batteries installed in buses or in the charging infrastructure during their scheduled idle times. Secondary grid services may help generating revenues for the operator of the public transportation system. The optimization may trade-off battery cost, potential revenues for secondary purposes, battery ageing, and impact on the installation primary purpose.

The optimization may be performed so as to determine parameters of the fleet of electric public transportation vehicles (fleet size and battery parameters of on-board batteries) and of the charging infrastructure (locations of charging stations, input and output powers etc.) such that an objective function is optimized under constraints. The constraints may enforce that a desired level of service according to a desired timetable is met along the plurality of geographical route profiles. The objective function may be dependent on ecological costs, such as an ecological footprint of installation and operation of the electric public transportation system, a number of working hours required for installing and operating the electric public transportation system, and/or a total cost of ownership. The total cost of ownership may be the capital costs and running costs for the primary purpose of the e-bus deployment, i.e. people transportation, optionally taking into account revenues generated by secondary services.

The identification of a suitable deployment configuration may depend on factors external to the public transportation system, such as the configuration of an electric grid to which the charging infrastructure is to be connected and/or the possibility of local energy production at charging stations using renewable energy sources. For illustration, the techniques according to embodiments may take into account a distance 58, 59 of candidate locations for charging stations from a power line 57 of an electric grid when determining the deployment configuration. Alternatively or additionally, the techniques according to embodiments may take into account an average number of sunshine hours at candidate locations for charging stations that may be equipped with photoelectric cells.

Methods, devices and systems according to embodiments may be generally operative as follows. Information on geographical route profiles and timetables for plural public transportation lines may be received. An initial set of parameters for both the fleet of electric public transportation vehicles and the charging infrastructure may be used, which may optionally be defined based on a user input or which may be a very conservative guess for parameters that allow the desired timetables to be met. Traffic simulations may be performed along the plurality of geographical route profiles. Energy consumption by the plurality of public transportation vehicles may be calculated. Battery ageing of the on-board batteries and, if present, of stationary batteries of the charging infrastructure may be computed based on the simulated charging cycles that depend on the energy consumption. The objective function may be evaluated. One or several parameters may be varied to optimize the objective function. Different optimization strategies for finding the parameters that optimize an objective function under constraints may be used.

The methods, devices and systems according to embodiments are operative to determine the deployment configuration simultaneously for a plurality of different public transportation lines having different geographical route profiles. Considerations such as whether a charging station can be shared among plural different transportation lines and how this affects charging durations, battery ageing and the compliance with desired timetables can thereby be taken into consideration. Both the parameters of the fleet of electric public transportation vehicles and of the charging infrastructure may be determined in one shot, i.e., by solving a single constrained optimization problem, for the plurality of different public transportation lines.

The methods, devices and systems according to embodiments may retrieve and use supplemental information over a wide area network such as the internet to perform the constrained optimization. For illustration, traffic data may be retrieved over a wide area network and may be used to compute energy consumption and battery ageing. Weather data may be retrieved over a wide area network and may be used to compute energy consumption and battery ageing, because heating and cooling of public transportation vehicles may have very significant effects on energy consumption. Elevation data may be retrieved over a wide area network and may be used to compute energy consumption and battery ageing, because the elevation profile along the geographical route significantly affects the energy consumption.

Devices and systems according to embodiments that perform the methods according to embodiments will be explained with reference to FIG. 3 to FIG. 5.

Figure 3:
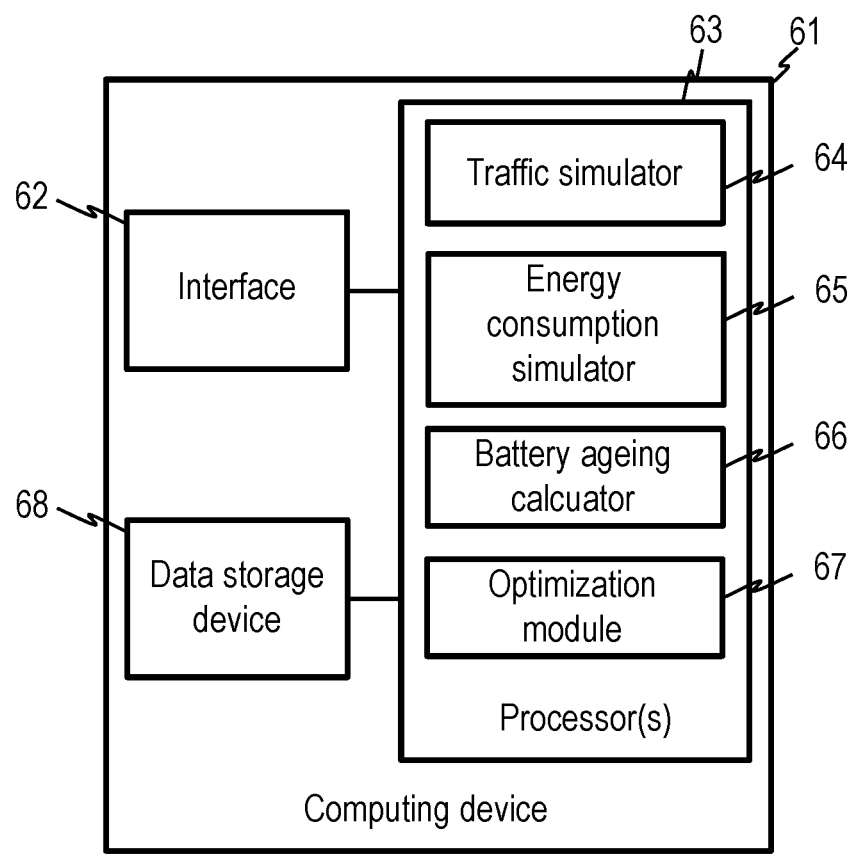
FIG. 3 is a schematic representation of a computing device according to an embodiment.

FIG. 3 is a block diagram of a computing device 61 operative to determine a deployment configuration for deployment of a public transportation system comprising a plurality of electric public transportation vehicles. The computing device 61 comprises one or several processors 63 and an interface 62. The interface 62 is operative to receive information on timetables and geographical route profiles of public transportation lines to be served by the plurality of electric public transportation vehicles. The interface 62 may be a user interface, in particular a graphical user interface, or a network interface.

The one or several processors 63 may be operative to solve a constrained optimization problem to determine the deployment configuration. The one or several processors 63 may be operative to automatically determine, prior to deployment of the public transportation system and based on the received information on timetables and geographical route profiles, a fleet size indicating a count of the plurality of electric public transportation vehicles that is to service the public transportation lines. The one or several processors 63 may be operative to automatically determine, prior to deployment of the public transportation system and based on the received information on timetables and geographical route profiles, on-board battery parameters of on-board batteries to be installed in the plurality of electric public transportation vehicles. The one or several processors 63 may be operative to automatically determine, prior to deployment of the public transportation system and based on the received information on timetables and geographical route profiles, charging infrastructure parameters associated with a charging infrastructure to be installed for charging the plurality of electric public transportation vehicles.

The constrained optimization problem may be solved such that the determined deployment configuration provides an optimum of an objective function as a function of the fleet size, the on-board battery parameters, and the charging infrastructure parameters has an optimal value under constraints. The constraints may be dependent on the received information on timetables and geographical route profiles.

The constraints and/or the objective function may be dependent on information that is external to the public transportation system, such as a configuration and coverage of an electric distribution grid to which the charging infrastructure is connected or the availability of renewable energy such as solar energy or wind that could be used for local energy production at a charging station.

During operation, the processor(s) 63 may execute instruction code to implement a traffic simulator 64, an energy consumption simulator 65, a battery ageing calculator 66, and an optimization module 67.

The traffic simulator 64 may generate a set of representative speed profiles. Speed profiles may be generated taking into account route elevation profile, road characteristics (turns, roundabouts, traffic lights, pedestrian crossing, maximum speed limits and so on). Historical traffic conditions along the plurality of geographical route profiles may be taken into account. The speed profiles may vary depending on the time of day and day of week, which may be reflected in the historical traffic conditions. The historical traffic conditions may be stored locally in a data storage device 68 or may be retrieved over a wide area network such as the internet from a database.

The energy consumption simulator 65 may compute representative energy consumption profiles for different speed profiles and different environmental conditions such as passenger load, ambient temperature etc. The passenger load may be received at the interface 62. The ambient temperature may be stored locally in the data storage device 68 or may be retrieved over a wide area network such as the internet from a database.

The battery ageing calculator 66 computes the expected battery lifetimes based on the representative energy consumption/power profile. The expected battery lifetimes are dependent on the charging infrastructure and charging cycles and are recomputed when the charging infrastructure parameters are varied during optimization.

The optimization module 67 determines improved deployment parameters based on outputs from the other modules such as representative energy consumption profiles and expected battery lifetimes. The optimization module 67 may vary the deployment parameters, such as fleet size, battery capacities and battery chemistries of on-board batteries, locations and configurations of charging stations to find a deployment configuration that solves the constrained optimization problem.

The deployment configuration may be output via a user interface or a data interface.

Figure 4:
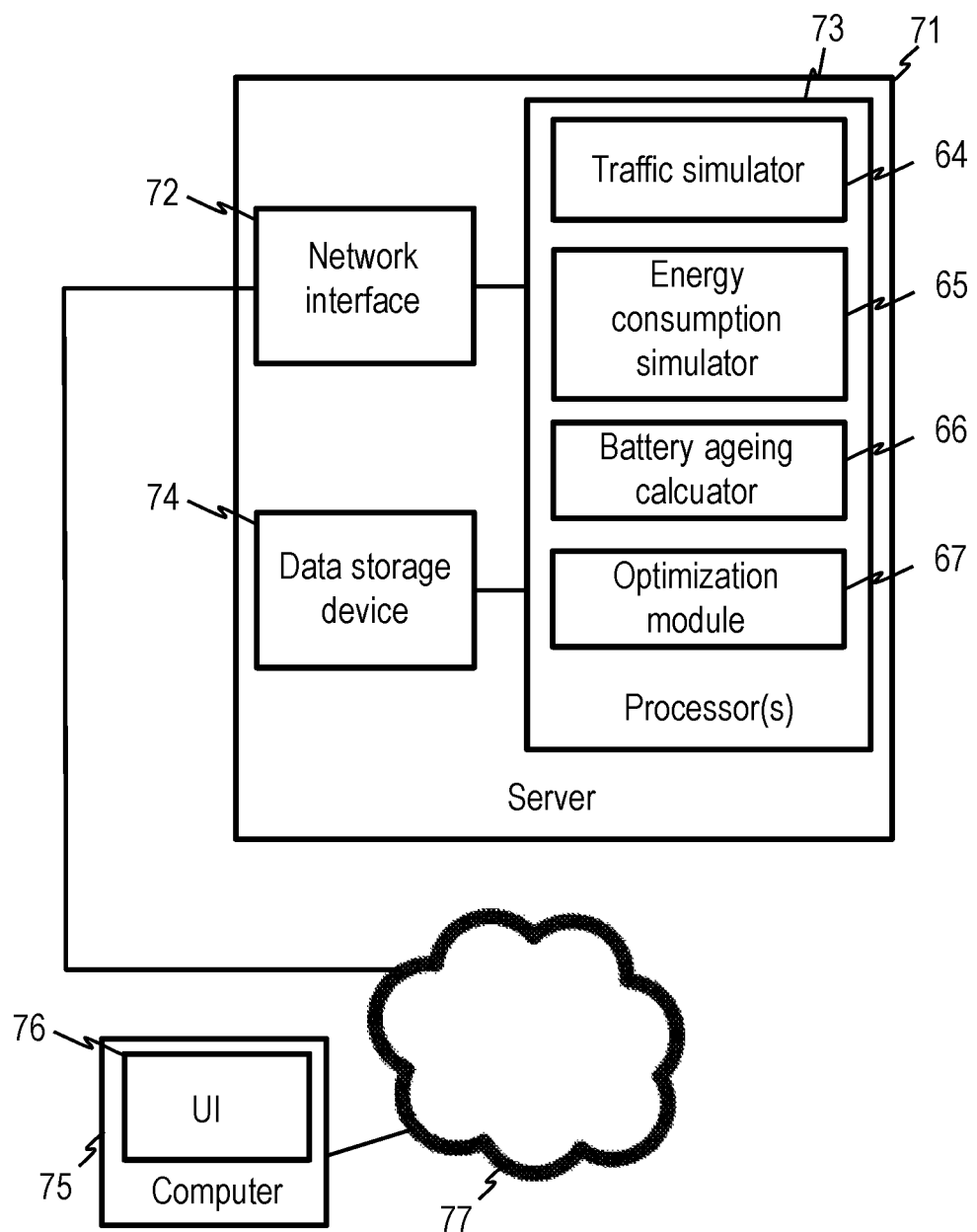
FIG. 4 is a schematic representation of a computing system according to an embodiment.

FIG. 4 is a block diagram of a distributed computing system comprising a server 71 operative to determine a deployment configuration for deployment of a public transportation system comprising a plurality of electric public transportation vehicles. The computing system comprises a terminal device 75, which may be portable or stationary user terminal device. Information on timetables and/or geographical route profiles may be input via a user interface 76 of the terminal device 75 and may be transmitted to the server 71 via a wide area network 77 such as the internet.

The server 71 has a network interface 72, one or several processor(s) 73, and a data storage device 74 that may be operative as described with reference to FIG. 3. The processor(s) 73 may execute instruction code to implement a traffic simulator 64, an energy consumption simulator 65, a battery ageing calculator 66, and an optimization module 67 to determine the deployment configuration, as has been explained with reference to FIG. 3.

Figure 5:
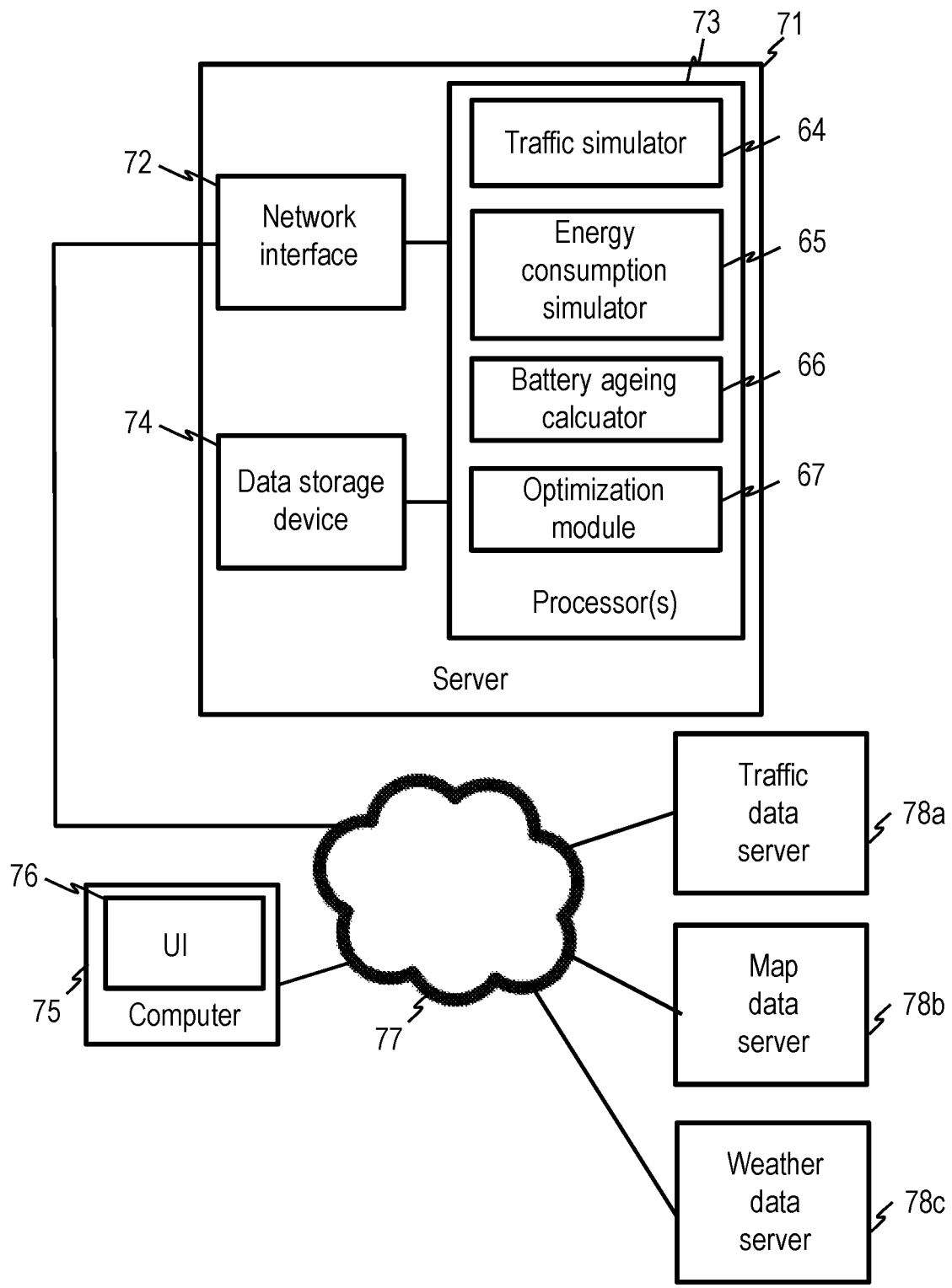
FIG. 5 is a schematic representation of a computing system according to an embodiment.

FIG. 5 is a block diagram of a distributed computing system comprising a server 71 operative to determine a deployment configuration for deployment of a public transportation system comprising a plurality of electric public transportation vehicles. The computing system comprises a terminal device 75, which may be portable or stationary user terminal device. Information on timetables and/or geographical route profiles may be input via a user interface 76 of the terminal device 75 and may be transmitted to the server 71 via a wide area network 77 such as the internet.

The server 71 may retrieve data that may affect the determination of the optimum deployment configuration of the electric public transportation system from plural database servers 78a, 78b, 78c.

The traffic simulator 64 executed by the server 71 may retrieve historical traffic data from the traffic data database server 78a.

The energy consumption simulator 65 executed by the server 71 may retrieve elevation data from the map data database server 78b to determine the energy consumption in dependence on the elevation profile along the plurality of geographical route profiles.

The energy consumption simulator 65 executed by the server 71 may retrieve weather data from the weather data database server 78c to determine the energy consumption in dependence on the weather conditions in the area 10 in which the public transportation system is to operate.

The server 71 has a network interface 72, one or several processor(s) 73, and a data storage device 74 that may be operative essentially as described with reference to FIG. 3 and FIG. 4.

In an embodiment, the determination of the deployment configuration is performed using a tool that is implemented by a web or cloud based computer program that can be accessed by multiple users with possibly different roles and it has integrated interfaces for providing inputs and receiving outputs. The tool can be executed on the server 71 or in a cloud based architecture. Some users can interact with the tool to input parameters related to engineering specifications and other users to work with the tool to create optimal designs for bus lines and networks.

The input interfaces 76 can be modular and can contain sub modules, e.g. for creating bus lines with route and bus stop information in a digital map application and other modules for inputting time tables either directly or by reading in from external applications such as a spreadsheet tool.

The output can be visualized on a computer screen or other optical output device, can be exported to, e.g., a spreadsheet tool or can be received in the form of a digital or printed design report.

Further extensions can include a sensitivity analysis module to study what if scenarios to gain additional insight and understand the limits of a specific solution or design or to evaluate the robustness against different failure scenarios.

Figure 6:
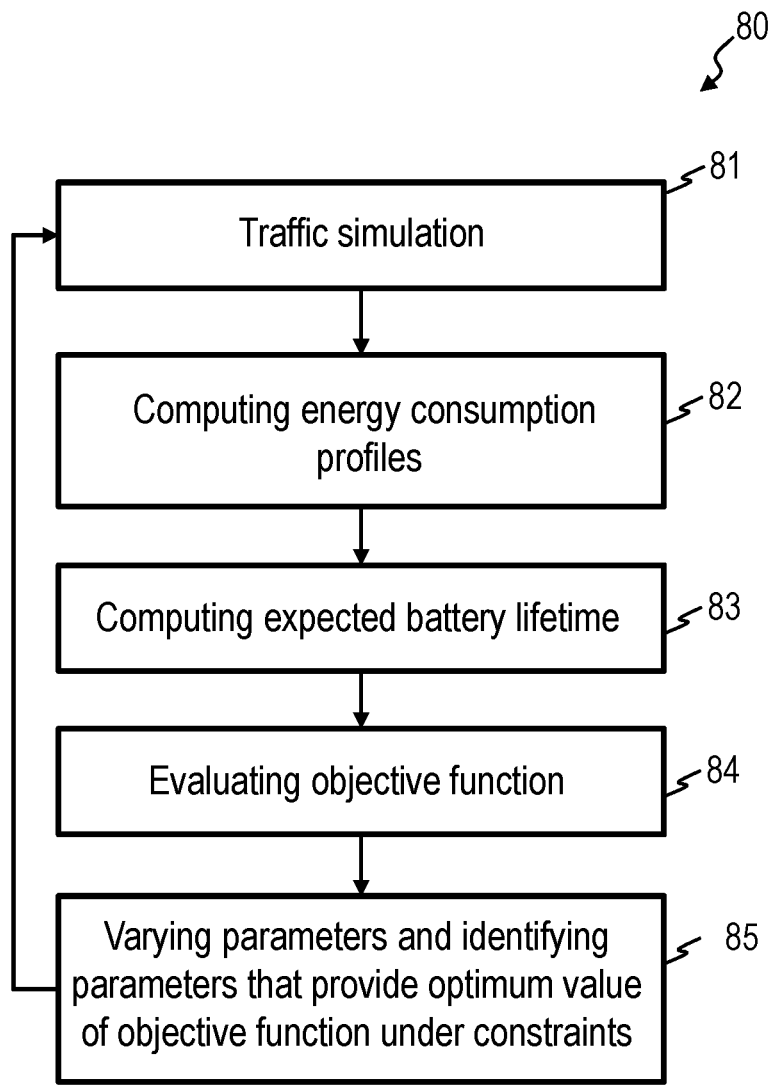
FIG. 6 is a flow chart of a method according to an embodiment.

FIG. 6 is a flow chart of a method 80 for determining the deployment configuration of an electric public transportation system. The method 80 may be performed by the computing device 61 or the server 71 of the distributed computing system explained with reference to FIG. 3 to FIG. 5.

Deployment parameters for deployment of the electric public transportation systems, such as a fleet size and a capacity and chemistry type of the on-board batteries, and/or parameters of the charging infrastructure, such as locations and configurations of charging stations, may be varied as the method steps 81 to 85 are repeated in an iterative manner. In an initial iteration, an initial guess for the deployment configuration may be used which may be determined automatically, e.g. using a very conservative guess for the fleet size, on-board battery capacities, and density of charging stations. The parameters defining the deployment configuration may be subsequently refined as the method iterates through steps 81 to 85.

At step 81, a traffic simulation is performed. The traffic simulation may be performed based on historical traffic data, geographical route profiles, and timetables. The geographical route profiles and timetables may be specified by one or several users via input interfaces. The historical traffic data may be retrieved from a traffic data database. The traffic simulation may provide simulated speed profiles.

At step 82, energy consumption profiles are computed. The energy consumption profiles may be computed in dependence on speed profiles, e.g., as a function of time of day. The energy consumption profiles may be computed further based on weather data and/or expected passenger loads and/or an elevation profile along the geographical route of the respective public transportation line.

At step 83, an expected battery lifetime may be computed. The expected battery lifetime may be dependent on the energy consumption profiles and charging cycles.

At step 84, an objective function may be evaluated. The objective function may be a function of the fleet size of the public transportation system, the on-board battery parameters, and the charging infrastructure parameters. The objective function may represent ecological costs, such as an ecological footprint, required for deployment and operation of the public transportation system. The objective function may represent a total cost of ownership for the public transportation system. The objective function may include costs associated with purchase, maintenance and operation of the plurality of electric vehicles comprising on-board batteries and costs associated with the installation maintenance and operation of the charging infrastructure.

At step 85, one or several of the fleet size, the on-board battery parameters, and the charging infrastructure parameters may be varied and the method may return to step 81. Constrained optimization of the objective function may be performed. The variation of parameters at step 85 may be performed so as to ensure that the constraints are met in the subsequent iterations.

While the computation of expected battery lifetimes at step 83, the evaluation of an objective function at step 84, and the variation and identification of parameters that optimize the objective function at step 85 are shown as separate steps in FIG. 6, these steps may also be combined and integrated in a single model. While steps 83, 84 and 85 may be executed as successive steps, they may also be combined into a single processing operation.

The fleet size, the on-board battery parameters, and the charging infrastructure parameters that provide an optimum value of the objective function may be output via a user interface, a data interface or may be stored locally.

Figure 7:
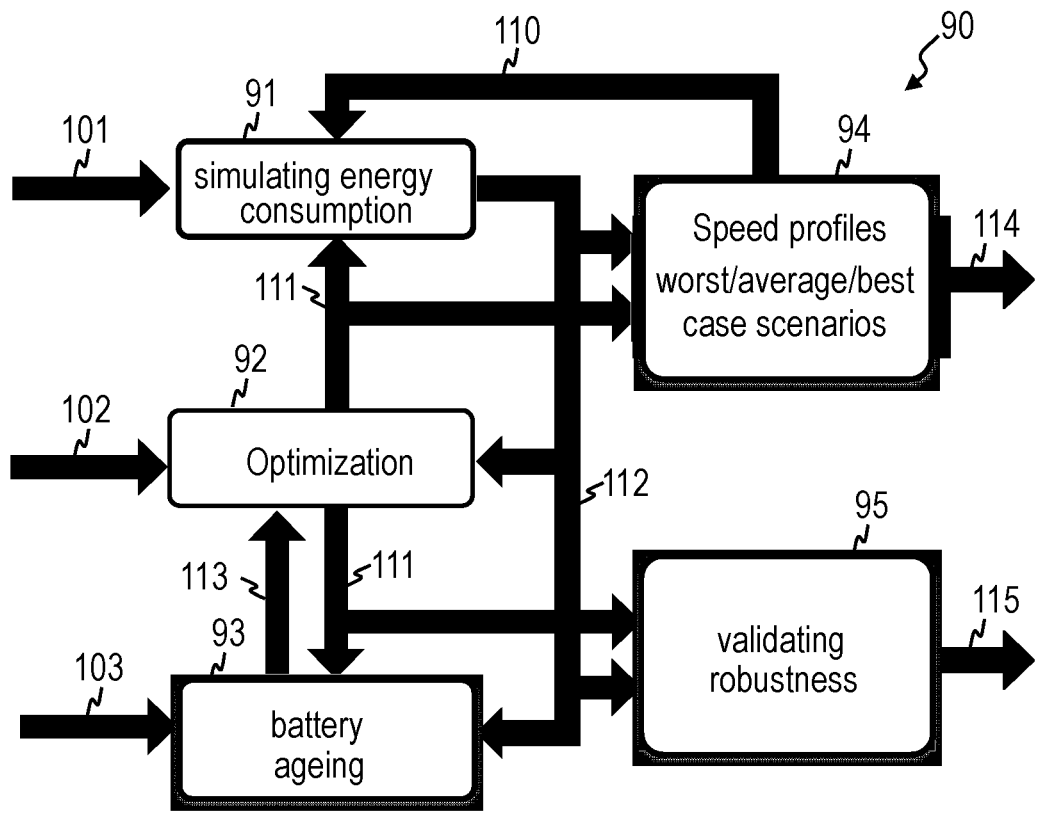
FIG. 7 is a block diagram representation of a modules executed to perform the method according to an embodiment.

FIG. 7 is a schematic block diagram representation of operation and data flow in a method, device and system according to an embodiment.

In order to formulate and solve the constrained optimization problem associated with determining the deployment configuration of an electric public transportation system, the following steps can be performed:

a. All user-specified input parameters may be read. The input parameters may include, e.g., parameters 101 selected from bus specifications, geographical bus line profile(s), timetable(s), battery specifications, feeding stations specifications, auxiliary specs, and weather conditions that may be used by an energy consumption simulation module 91.

The input parameters may include, e.g., parameters 103 selected from timetable(s), battery specifications, feeding stations specifications, and usage statistics that may be used by battery ageing module 93 that calculated battery ageing.

Input parameters 102 may also define which cost model and/or which constraints are to be used by the optimization module 92 that performs the constrained optimization.

b. An initial guess for the deployment parameters such as battery size, position of charging stations etc. may be obtained. The initial guess may be user-defined or may be a very conservative set of parameters (using a large vehicle fleet, a large density of charging stations, and large capacities of on-board vehicles) that can subsequently be refined.

c. A traffic simulation module 94 may be executed to generate a set of representative speed profiles. The representative speed profiles may reflect different traffic conditions. The speed profiles 110 may be provided to the energy consumption simulation module 91.

d. The energy consumption simulation module 91 may be executed to compute representative energy consumption profiles based on the parameters for different speed profiles and different environmental conditions such as passenger load, ambient temperature etc. In a first iteration, the representative energy consumption profiles can be computed for the initial parameters 101. The energy consumption profiles 112 may be provided to the battery ageing module 93 and the optimization module 92.

e. The battery ageing module 93 may be executed to compute the expected battery lifetimes based on the energy consumption profiles 112, which are in turn dependent on the representative speed profiles 110.

f. The optimization module 92 may be executed to obtain optimized deployment configuration parameters based on, e.g., energy consumption profiles 112 and expected battery lifetimes 113. Results of the optimization may include updated battery parameters and updated charging infrastructure parameters 111. The updated battery parameters and updated charging infrastructure parameters 111 may be provided to the energy consumption simulation module 91 and the battery ageing module 93 for the subsequent iterative improvement of the deployment configuration.

g. Optionally, the results may be refined by repeating steps c) to f) using the optimized deployment configuration parameters 111 obtained during the respective latest call to the optimization module 92.

h. Optionally, a validation module 95 may compute a sensitivity/elasticity of the solution towards varying input parameters by i) using solution information obtained from the last call to the optimization module and/or ii) making multiple calls to the energy consumption simulation module 91 with slightly changed values for the optimized set of deployment configuration parameters. The resulting energy consumption profiles may be analyzed.

By performing the above steps, candidate solutions for feeding station locations and battery capacities may be generated, which can then be used against a variety of problem specific inputs provided by users, which specify the problem definition as well as all relevant parameters. The number of parameters can change depending on the formulation of the sub problems and the level of detail and accuracy that is desired. Problem specific inputs may include the constraints on the system such as timetable information, available battery chemistries, aging models for batteries, energy consumption models for vehicles, traffic information for calculating speed profiles, weather information and Heating, Ventilation and Air Conditioning (HVAC) operation policies for calculating auxiliary energy consumption, without being limited thereto.

The function of various modules, such as modules 92 and 93, may be combined into a single module. FIG. 7 does not require the battery ageing and optimization to be performed by separate modules of computer instruction code. Alternatively or additionally, the operation of various other modules explained with reference to FIG. 7 may also be combined with each other and integrated into a single module.

The methods and devices explained above allow the deployment configuration to be obtained for a network of several public transportation lines services be electric public transportation vehicles. This allows the common use of charging infrastructure along plural different transportation lines to be accommodated when assessing the quality of a deployment configuration.

The objective function and constraints may take various forms, depending on the characteristics that are of importance to the operator of the public transportation network. In some implementations, and for ease of understanding, the objective function may be regarded to be a function $$O(tb; ci; ep) \quad (1)$$

where O is the objective function; tb is a vector including the battery capacities and battery chemistries of N electric public transportation vehicles as vector elements; N is the fleet size; ci is a vector including the locations and other parameters of the charging infrastructure as vector elements; and ep is a vector including parameters that are not subject to the optimization and that may be regarded to be fixed. For illustration, the parameters ep may include the layout of an electric grid and/or distances of candidate locations for charging stations from the electric grid, respectively for a plurality of candidate locations for the charging stations. The parameters ep may include the geographical route profiles. Alternatively or additionally, the parameters ep may include weather data, which may influence energy consumption profiles, traffic data, elevation along the geographic route profiles and/or predicted passenger numbers. The parameters ep may include parameters that may affect the capability of producing energy locally at a charging station based on renewable energies, such as solar energy or wind energy.

At least a part of the constraints may be implemented as hard constraints. For illustration, the constrained optimization may be performed such that the remaining energy in the on-board battery remains above a threshold level for any vehicle that is in service. Non-acceptable delays as compared to the timetable may also be implemented as hard constraints.

Alternatively or additionally, least a part of the constraints may be implemented as soft constraints. In this case, the constrained optimization may find the optimum of a function $$O(tb; ci; ep)+C(tb; ci; ep; tt) \quad (2)$$

C is a cost penalty term. The cost penalty term C may include a term that increases as a function of the deviation of the simulated speed profile from the speed profile that must be met according to the timetable tt. Alternatively or additionally, the cost penalty term C may include a term that represents a distance of the charging station(s) from the electric grid.

Flexibility may thereby be provided with regard to the timetables. For illustrations, a user may input information indicative of possible deviations from the timetables. The information indicative of possible deviations from the timetables may allow a user to specify a minimum and/or maximum time at a terminal. In case such flexibility is provided, the method may further comprise outputting an optimum time within the indicated range. The optimum time may be optimum with respect to all constraints that are to be observed. When a user is allowed to specify a minimum and/or maximum time at a terminal, the user may also be allowed to enter a maximum time equal to the minimum time, thereby indicating that the time is a hard constraint for the respective terminal.

The specific structure of the objective function O depends on the objectives that are to be attained with the electric public transportation network. For illustration, the cost function O may be or may include the sum of inverse battery lifetimes of the on-board batteries and of the stationary batteries of the charging infrastructure if maintenance work associated with battery replacement and/or the ecological impact of battery replacement are to be minimized.

A multi-objective optimization may be performed. The method and system according to an embodiment may be configured to determine the optimum deployment configuration respectively for each one of plural different objective functions. The user may select between the different solutions. Alternatively or additionally, the method and system may be configured to determine the parameters that optimize $$(\Sigma_k w_k O_k(tb; ci; ep))+C(tb; ci; ep; tt) \quad (3)$$

where $O_k$ denote different cost functions (such as ecological footprint and working hours for installation or economic costs) and $w_k$ are weighting factors, with k being an integer greater than 1. The user may set the weighting factors so as to attain a trade-off between various objectives, such as capital cost, ecological footprint, and/or operating cost etc.

The cost function O may have a more complex form. For illustration, the cost function O may include terms reflecting the expenses associated with the public transportation network. Such expenses, or the total cost of ownership, may include the following:
  capital expenditure; this may be dependent on one or several of the following:
    Cost of buses
    Cost of bus batteries (considering their expected lifetime and the amortization rate)
    Cost of the charging infrastructure (installed at depot, terminal, and bus stops)
    Digging costs (to connect the charging infrastructure to the grid)
  operating expenses; this may be dependent on one or several of the following:
    Maintenance for buses and charging infrastructure
    Yearly utility connection fees
    Cost of energy delivered by the charging infrastructure
    Bus driver cost Given a bus line or network of bus lines, their features (service frequency, bus capacity, timetable, altitude profile, etc.), a set of potential different on-board battery technologies, different charging infrastructure options (with or without intermediate energy storage, and with different input and output power) and given options to participate in secondary services related to the power grid, the methods, devices and systems according to embodiments can be operative to minimize the total cost of ownership. The following parameters can be determined for that purpose:
  Size and chemistry of the installed batteries (in electric public transportation vehicles and charging infrastructure)
  The type of charging stations (which input/output power, with/without intermediate energy storage)
  Number and locations of charging stations
  Possibly, oversizing a charging station to allow sharing it with multiple lines (in case of network of lines)
  Possibly, adjust the layover time within a desired range to favor longer recharging times
  The size of the bus fleet to meet the desired level of service When extended to accommodate secondary electric grid services, the on-board batteries present in buses and possibly charging infrastructure can be used to generate revenues from grid services. A trade-off between additional potential revenues, potential oversizing of the batteries and battery ageing can be found automatically using the methods, devices and systems according to embodiments. The investment in the bus and infrastructure batteries can be used to offer grid services (e.g. secondary frequency regulation or distribution grid support); nevertheless, this secondary purpose may affect the battery lifetime and therefore needs to be assessed by the constrained optimization.

The kind of charging infrastructure and on-board battery size as well as the specific bus route features impact, inter alia, the number of buses in the fleet and the respective driver costs; the running cost for the energy/power provided by the feeding stations; and the ageing of the battery (both on the bus and as part of the infrastructure). Trading off between all the degrees of freedom in order to achieve the optimum solution is therefore a highly complex task. The methods, devices and systems according to embodiments assist a user in this highly complex task.

When the total cost of ownership is to be minimized, all the different monetary cost and benefit aspects of an electric bus fleet can be considered in a single unified constrained optimization problem aiming to minimize the total cost of ownership. The solution of this optimization problem leads to attractive decisions for the deployment parameters.

Other objectives can be taken into account, while the methods, devices and systems according to embodiments assist a user in finding a suitable deployment configuration for a public transportation network. As explained above, multi-objective optimization may be performed.

As part of the process of determining a deployment configuration, a decision can be made on the charging strategy that is to be used. The charging strategy may depend inter alia on the interplay of timetable(s), fleet size, and electric grid coverage.

Figure 8:
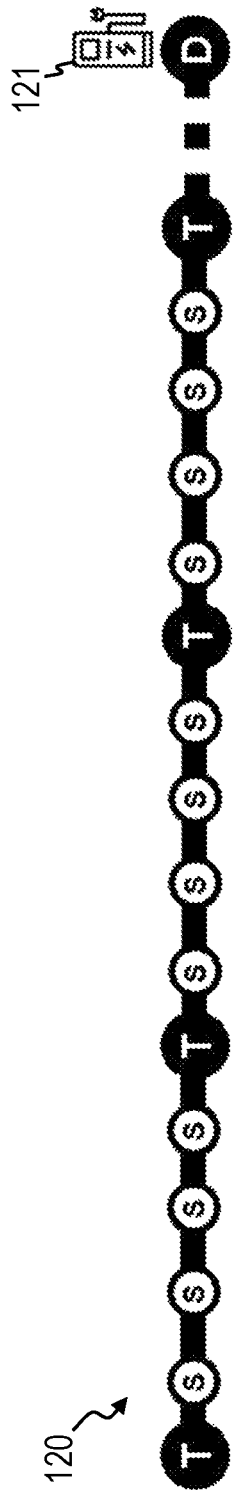
FIG. 8, FIG. 9, and FIG. 10 are schematic representations of candidate charging infrastructures.
Figure 9:
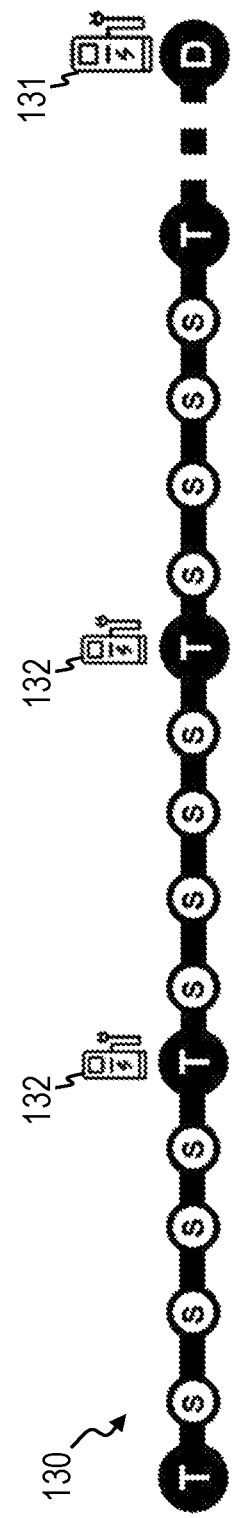
Figure 10:
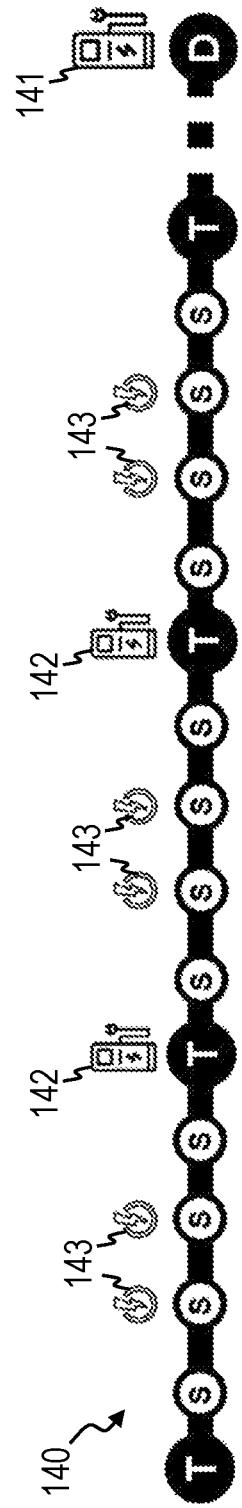

FIGS. 8 to 10 illustrate three charging strategies. The letter "D" respectively designates a depot at which over-night charging can be performed. The letter "T" respectively designates a terminal which is a candidate for terminal charging. The letter "S" designates a bus stop.

FIG. 8 illustrates a charging infrastructure 120 for over-night depot charging, where the on-board battery lasts for the whole day of operations and needs recharging only over-night at the depot by a charging station 121.

FIG. 9 illustrates a terminal-only charging infrastructure 130, also referred to as OppCharge, where the on-board battery gets partially replenished every time it reaches a terminal equipped with a charging station 132 and also over-night in the depot by charging station 131.

FIG. 10 illustrates a charging infrastructure 140 where the on-board battery gets additionally recharged also at some selected bus stops by flash charging stations 143 for a limited duration while passengers get off/on the bus. It will be appreciated that the charging stations 143 at the bus stops are different in configuration from the charging stations 141, 142 at the depot and terminals. For illustration, the charging stations 143 may be implemented such that they do not require a wired connection between the charging station 143 and the public transportation vehicle to perform charging.

Figure 11:
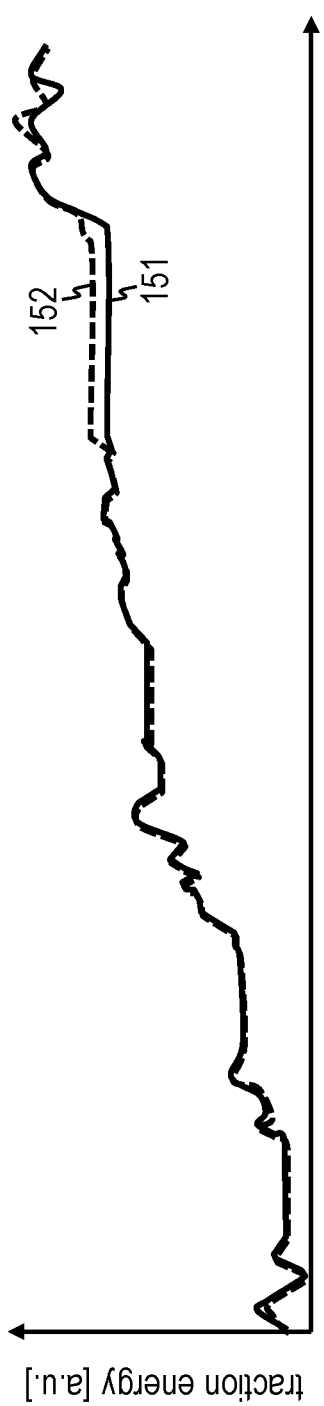
FIG. 11 illustrates validation results of an energy consumption calculation performed in an embodiment.

FIG. 11 illustrates a measured traction energy 151 as compared to a simulated traction energy 152 used in the methods, devices and systems according to embodiments. In order to ensure high quality results of the constrained optimization problem, plural different models for public transportation vehicles may be validated against the measured traction energy 151. The one of the models that most closely mimics the measured traction energy 151, which has been measured for at least one test route for example, may be used for determining the deployment configuration.

The deployment configuration, in particular the fleet size and the on-board battery parameters, may depend on the service level that is to be provided along the different public transportation lines. For illustration, during certain times of the day, it may be desirable for electric public transportation vehicles to operate at a higher service frequency for improved service. This will affect the state of charge of the on-board batteries.

Figure 12:
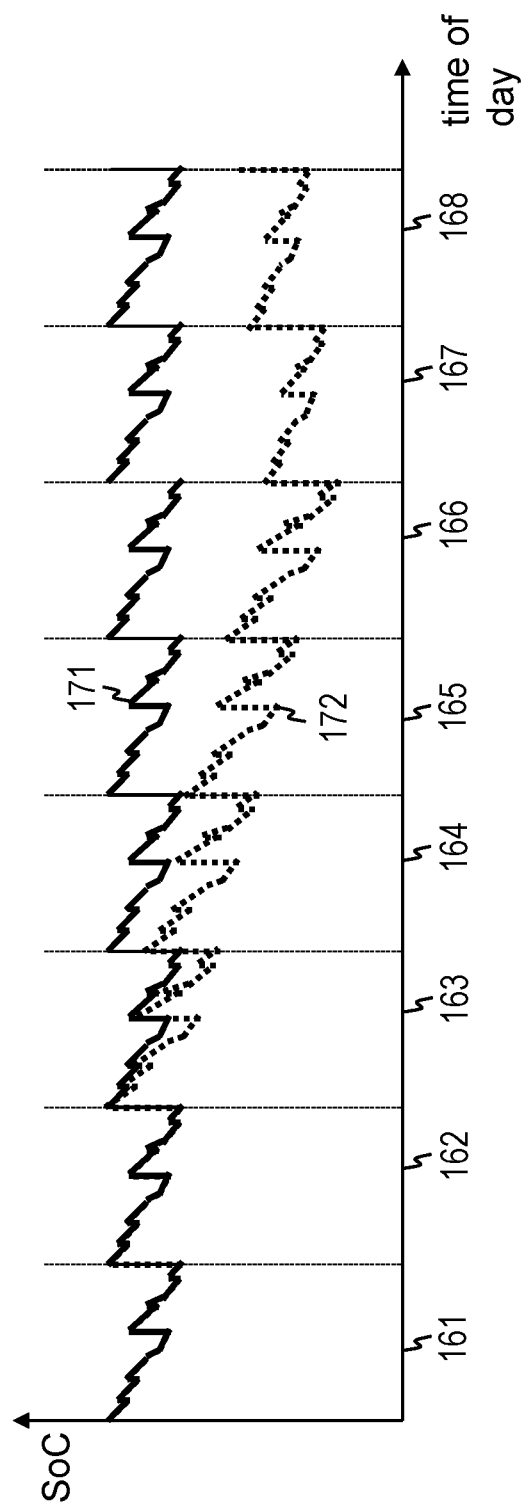
FIG. 12 illustrates a state of charge (SoC) for two deployment scenarios using different fleet sizes.

FIG. 12 illustrates a state of charge 171 of an on-board battery when the service level does not vary in various time windows 161-168 during the day. FIG. 11 also illustrates a state of charge 172 of an on-board battery when the service level varies in various time windows 161-168 during the day. For illustration, when the service level of the electric public transportation vehicle increases such that recharging times at a terminal are reduced because the vehicle needs to start a new roundtrip earlier, the power in the battery decreases more rapidly, as indicated by the state of charge 172.

Figure 13:
FIG. 13 illustrates an optimization strategy in an embodiment.

The methods, devices and systems according to embodiments allow the fleet size to be determined so as to maximize charging time at a terminal, while keeping the fleet size to a desired level. FIG. 13 illustrates the required fleet size 181 as a function of waiting time at a terminal that is used for charging. The methods, devices and systems allow the fleet size and on-board battery parameters to be set with respect to each other in such a way that the electric public transportation vehicle(s) operate at one of the waiting times 182, 183, where the terminal charging time is maximized while preventing an increase in fleet size that would be incurred for a marginally larger waiting time. I.e., the optimization may select the fleet size, on-board battery parameters, and charging infrastructure parameters by setting the waiting time at a terminal to a value which does not require the fleet size to be increased by one vehicle, while maximizing the waiting (and thus charging) time.

Figure 14:
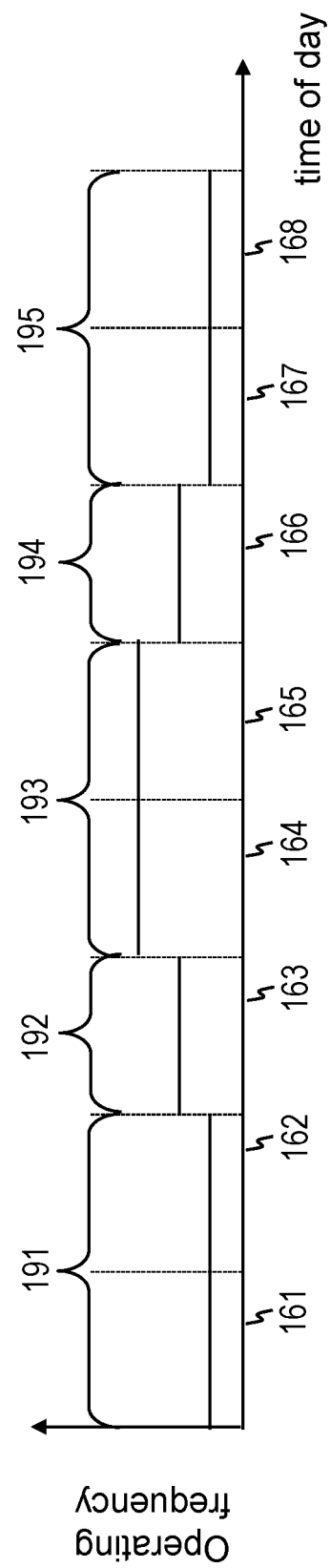
FIG. 14 illustrates varying operation frequencies along a bus line that may be taken into account in embodiments.

The methods, devices and systems according to embodiments can accommodate varying service levels. FIG. 14 illustrates the operating frequency at which an electric vehicle is to service a public transportation line. The operating frequency may be higher in time intervals 193 than in other time intervals 191, 192, 194, 195 during the day. Such variations in operating frequency may be taken into account when determining speed profiles, energy consumption, battery lifetime, number of operating buses (and the related cost of bus drivers). The varying service level also affects the capacity that on-board batteries should have, in order to ensure that the state of charge remains above a threshold even in the time interval 193 with higher service frequency in which there may be less time for recharging at terminals or bus stops.

Figure 15:
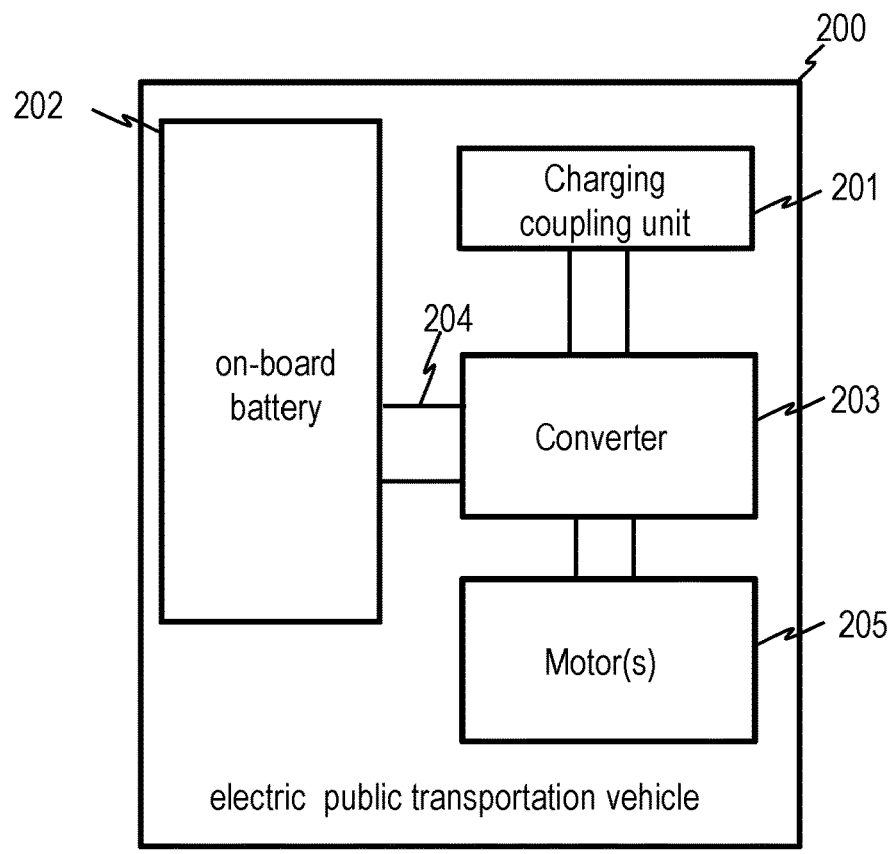
FIG. 15 is a block diagram representation of an electric public transportation vehicle.
Figure 16:
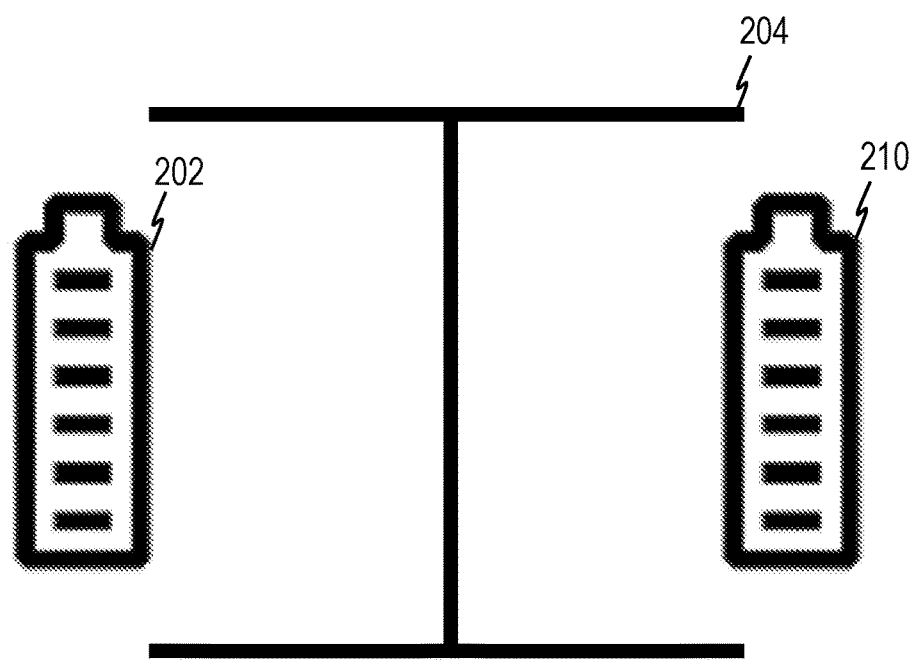
FIG. 16 illustrates a technique considering a DC link voltage of the electric public transportation vehicle when determining parameters of the charging infrastructure.

The methods, devices and systems according to embodiments allow constraints imposed by the on-board electric circuitry of an electric public transportation vehicle to be taken into account when determining the deployment configuration, as illustrated in FIG. 15 and FIG. 16.

FIG. 15 is a schematic block diagram representation of an electric public transportation vehicle 200, such as an electric bus. The electric public transportation vehicle 200 comprises a charging coupling unit 201 that may be configured for wired and, optionally, wireless charging. The electric public transportation vehicle 200 may comprise a converter 203 configured to convert the output of an on-board battery 202 for supplying one or several electric motors 205 with energy.

In some implementations, the converter 203 may optionally be configured to convert the output of the charging coupling unit 201 for storage in the on-board battery 202 via a DC link 204, while this is not required for all electric public transportation vehicles. The methods and systems according to embodiments may allow a user to specify whether the on-board battery 202 is charged via the converter 203 or not. Different configurations of electric public transportation vehicles may be specified thereby.

The charging infrastructure parameters may be determined taking into consideration the bus voltage of the on-board DC link 204, as illustrated in FIG. 16. For illustration, an output voltage of an energy storage 210 included in the charging infrastructure may be selected based on the voltage limit(s) on the DC link 204.

Methods, devices and systems according to embodiments assist a user in the complex task of determining a deployment configuration of an electric public transportation network. The fleet size, on-board battery parameters, and charging infrastructure parameters may be determined concurrently for a plurality of different public transportation lines. This allows the interactions in the various parameters to be taken into account which result from the fact that different public transportation lines can share charging infrastructure or that grid services at different levels can be provided from a collection of infrastructure elements and public transportation vehicles as a fleet.

Methods, devices and systems according to embodiments harness the predictability of public transportation routes and associated schedules. This allows an analysis and evaluation of:

the energy content of the on-board batteries throughout daily operations (considering rush/non-rush hours and their impact on bus passenger load and possible delays due to traffic), therefore minimizing the amount of unnecessary charging stations and downsizing the bus batteries, and the ageing of the on-board batteries, therefore choosing the appropriate size/chemistry for the predicted duty cycles, ultimately avoiding accelerating ageing of one of the on-board batteries.

While the invention has been described in detail with reference to public transportation fleets, certain aspects of the methods and devices disclosed herein may also be applied for deployment of private fleets.

While the invention has been described in detail in the drawings and foregoing description, such description is to be considered illustrative or exemplary and not restrictive. Variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The invention claimed is:

1. A method of determining a configuration for deployment of a public transportation system comprising a plurality of electric public transportation vehicles, in particular electric buses, the method comprising:

receiving, at an interface, information on timetables and geographical route profiles of public transportation lines to be served by the plurality of electric public transportation vehicles;

retrieving, by at least one processor, over a data network supplemental information comprising at least one of the following:

historical weather conditions in an area in which the public transportation system is to be deployed;

an elevation profile along the geographical route profiles;

historical traffic data in the area;

expected passenger counts along the geographical route profiles; and automatically determining by the at least one processor, prior to deployment of the public transportation system and based on the received information on timetables and geographical route profiles, at least the following:

a fleet size indicating a count of the plurality of electric public transportation vehicles that is to service the public transportation lines and on-board battery parameters of on-board batteries to be installed in the plurality of electric public transportation vehicles and charging infrastructure parameters associated with a charging infrastructure to be installed for charging the plurality of electric public transportation vehicles for which an objective function that is dependent on the fleet size, the on-board battery parameters, and the charging infrastructure parameters has an optimal value under constraints, the constraints being dependent on the received information on timetables and geographical route profiles, wherein automatically determining the fleet size, the on-board battery parameters, and the charging infrastructure parameters comprises the following steps performed prior to deployment of the public transportation system:

simulating an electric power consumption along the geographical route profiles using the supplemental information; and computing on-board battery lifetimes of the on-board batteries to be installed in the plurality of electric public transportation vehicles based on the simulated electric power consumption, wherein the objective function is dependent on both the simulated electric power consumption and the computed on-board battery lifetimes.

2. The method of claim 1, wherein the at least one processor determines the fleet size, the on-board battery parameters and the charging infrastructure parameters concurrently.

3. The method of claim 1, wherein the constraints enforce that public transportation service is provided in accordance with the timetables and geographical route profiles once the public transportation system has been deployed.

4. The method of claim 1, wherein determining the charging infrastructure parameters comprises determining locations at which charging stations are to be installed relative to the geographical route profiles.

5. The method of claim 1, wherein the simulated electric power consumption is determined in dependence on the historical weather conditions and the predicted passenger counts along the geographical route profiles.

6. The method of claim 1, wherein determining the on-board battery parameters comprises determining a chemistry type and/or capacity of the on-board batteries to be installed in the electric public transportation vehicles.

7. A method of determining a configuration for deployment of a public transportation system comprising a plurality of electric public transportation vehicles, in particular electric buses, the method comprising:

receiving, at an interface, information on timetables and geographical route profiles of public transportation lines to be served by the plurality of electric public transportation vehicles;

retrieving, by at least one processor, over a data network supplemental information comprising at least one of the following:
- historical weather conditions in an area in which the public transportation system is to be deployed;
- an elevation profile along the geographical route profiles;
- historical traffic data in the area;
- expected passenger counts along the geographical route profiles; and automatically determining by the at least one processor, prior to deployment of the public transportation system and based on the received information on timetables and geographical route profiles, at least the following:
- a fleet size indicating a count of the plurality of electric public transportation vehicles that is to service the public transportation lines and
- on-board battery parameters of on-board batteries to be installed in the plurality of electric public transportation vehicles and
- charging infrastructure parameters associated with a charging infrastructure to be installed for charging the plurality of electric public transportation vehicles for which an objective function that is dependent on the fleet size, the on-board battery parameters, and the charging infrastructure parameters has an optimal value under constraints, the constraints being dependent on the received information on timetables and geographical route profiles, wherein automatically determining the fleet size, the on-board battery parameters, and the charging infrastructure parameters comprises the following steps performed prior to deployment of the public transportation system:
- simulating an electric power consumption along the geographical route profiles using the supplemental information; and
- computing on-board battery lifetimes of the on-board batteries to be installed in the plurality of electric public transportation vehicles based on the simulated electric power consumption, wherein the simulated electric power consumption is determined in dependence on the historical weather conditions and the predicted passenger counts along the geographical route profiles.

8. A method of determining a configuration for deployment of a public transportation system comprising a plurality of electric public transportation vehicles, in particular electric buses, the method comprising:

receiving, at an interface, information on timetables and geographical route profiles of public transportation lines to be served by the plurality of electric public transportation vehicles; and automatically determining by at least one processor, prior to deployment of the public transportation system and based on the received information on timetables and geographical route profiles, at least the following:
- a fleet size indicating a count of the plurality of electric public transportation vehicles that is to service the public transportation lines and
- on-board battery parameters of on-board batteries to be installed in the plurality of electric public transportation vehicles and
- charging infrastructure parameters associated with a charging infrastructure to be installed for charging the plurality of electric public transportation vehicles for which an objective function that is dependent on the fleet size, the on-board battery parameters, and the charging infrastructure parameters has an optimal value under constraints, the constraints being dependent on the received information on timetables and geographical route profiles, wherein determining the charging infrastructure parameters comprises determining which types of charging stations are to be installed relative to the geographical route profiles.

9. The method of claim 8,
wherein determining which types of charging stations are to be installed comprises at least one of:
- determining an input power of respectively each one of the charging stations;
- determining an output power respectively each one of the charging stations;
- determining a capacity of an energy storage system of each charging station having an energy storage system;
- determining which ones of the charging stations are to be shared by at least two different public transportation lines having different geographical route profiles.

10. The method of claim 8,
wherein determining the on-board battery parameters comprises determining a chemistry type and/or capacity of the on-board batteries to be installed in the electric public transportation vehicles.

11. The method of claim 8, wherein the types of charging stations are selected from a group consisting of charging stations having an energy storage system and charging stations having no energy storage system.

12. The method of claim 11,
wherein determining which types of charging stations are to be installed comprises at least one of:
- determining an input power of respectively each one of the charging stations;
- determining an output power respectively each one of the charging stations;
- determining a capacity of an energy storage system of each charging station having an energy storage system;
- determining which ones of the charging stations are to be shared by at least two different public transportation lines having different geographical route profiles.

13. The method of claim 8,
wherein determining which types of charging stations are to be installed comprises at least one of:
- determining an input power of respectively each one of the charging stations;
- determining an output power respectively each one of the charging stations;
- determining a capacity of an energy storage system of each charging station having an energy storage system;
- determining which ones of the charging stations are to be shared by at least two different public transportation lines having different geographical route profiles.

14. A method of determining a configuration for deployment of a public transportation system comprising a plurality of electric public transportation vehicles, in particular electric buses, the method comprising:

receiving, at an interface, information on timetables and geographical route profiles of public transportation lines to be served by the plurality of electric public transportation vehicles; and automatically determining by at least one processor, prior to deployment of the public transportation system and based on the received information on timetables and geographical route profiles, at least the following:
  a fleet size indicating a count of the plurality of electric public transportation vehicles that is to service the public transportation lines and
  on-board battery parameters of on-board batteries to be installed in the plurality of electric public transportation vehicles and
  charging infrastructure parameters associated with a charging infrastructure to be installed for charging the plurality of electric public transportation vehicles
for which an objective function that is dependent on the fleet size, the on-board battery parameters, and the charging infrastructure parameters has an optimal value under constraints, the constraints being dependent on the received information on timetables and geographical route profiles;
and further comprising:
determining, by the at least one processor, a robustness of the determined fleet size, on-board battery parameters and charging infrastructure parameters towards system disruptions, and/or
determining, by the at least one processor, multiple fleet sizes, on-board battery parameter sets and/or charging infrastructure parameter sets, together with their key performance indicators for outputting via a user interface, optionally wherein the key performance indicators comprise costs under different lifetime assumptions, performance key performance indicators, and/or robustness towards system disruptions.

15. A computing device or distributed computing system for determining a configuration for deployment of a public transportation system comprising a plurality of electric public transportation vehicles, comprising:
  an interface adapted to receive information on timetables and geographical route profiles of public transportation lines to be served by the plurality of electric public transportation vehicles;
  at least one processor; and
  a memory comprising a computer-executable instruction code that, in response to execution by the at least one processing device, causes the computing device or distributed computing system to:
  automatically determine, prior to deployment of the public transportation system and based on the received information on timetables and geographical route profiles, at least the following:
    a fleet size indicating a count of the plurality of electric public transportation vehicles that is to service the public transportation lines and
    on-board battery parameters of on-board batteries to be installed in the plurality of electric public transportation vehicles and
    charging infrastructure parameters associated with a charging infrastructure to be installed for charging the plurality of electric public transportation vehicles, the determination of the charging infrastructure parameters comprising determining which types of charging stations are to be installed relative to the geographical route profiles,
  for which an objective function that is dependent on the fleet size, the on-board battery parameters, and the charging infrastructure parameters has an optimal value under constraints, the constraints being dependent on the received information on timetables and geographical route profiles.

16. A computing device or distributed computing system, comprising:
  an interface configured to receive information on timetables and geographical route profiles of public transportation lines to be served by a plurality of electric public transportation vehicles;
  at least one processor;
  a memory comprising a computer-executable instruction code that, in response to execution by the at least one processing device, causes the computing device or distributed computing system to:
  automatically determine, based on the received information on timetables and geographical route profiles and prior to deployment of the public transportation system, at least the following:
    a fleet size indicating a count of the plurality of electric public transportation vehicles that is to service the public transportation lines and
    on-board battery parameters of on-board batteries to be installed in the plurality of electric public transportation vehicles and
    charging infrastructure parameters associated with a charging infrastructure to be installed for charging the plurality of electric public transportation vehicles
  for which an object function that is dependent on the fleet size, the on-board battery parameters, and the charging infrastructure parameters has an optimal value under constraints, the constraints being dependent on the received information on timetables and geographical route profiles, and
  determine at least one of the following:
    a robustness of the determined fleet size, on-board battery parameters and charging infrastructure parameters towards system disruptions, and/or
    multiple fleet sizes, on-board battery parameter sets and/or charging infrastructure parameter sets, together with their key performance indicators for outputting via a user interface, optionally wherein the key performance indicators comprise costs under different lifetime assumptions, performance key performance indicators, and/or robustness towards system disruptions.

17. The computing device or distributed computing system of claim 16,
  wherein the at least one processor is configured to retrieve over a data network supplemental information comprising at least one of the following:
    historical weather conditions in an area in which the public transportation system is to be deployed;
    an elevation profile along the geographical route profiles;
    historical traffic data in the area;
    expected passenger counts along the geographical route profiles;
  wherein the at least one processor is further configured to:
    simulate an electric power consumption along the geographical route profiles using the supplemental information; and
    compute on-board battery lifetimes of the on-board batteries to be installed in the plurality of electric public transportation vehicles based on the simulated electric power consumption,
  wherein the objective function is dependent on both the simulated electric power consumption and the computed on-board battery lifetimes.

* * * * *